United States Patent

Walker

[15] 3,665,753
[45] May 30, 1972

[54] FLUID-OPERATED GAGE

[72] Inventor: John H. Walker, Ketering, Ohio
[73] Assignee: The Bendix Corporation
[22] Filed: Oct. 28, 1970
[21] Appl. No.: 84,834

Related U.S. Application Data

[63] Continuation-in-part of Ser. No. 793,270, Jan. 23, 1969, Pat. No. 3,577,766.

[52] U.S. Cl. .................................................... 73/37.9
[51] Int. Cl. ........................................... G01b 13/10
[58] Field of Search ................... 73/37–37.9, 45.1; 33/DIG. 2; 137/81.5

[56] References Cited

UNITED STATES PATENTS

| | | | |
|---|---|---|---|
| 3,273,378 | 9/1966 | Gesell | 73/37.9 |
| 3,349,605 | 10/1967 | Minix | 73/37.9 |
| 3,577,766 | 5/1971 | Walker | 73/37.9 |

Primary Examiner—Louis R. Prince
Assistant Examiner—William A. Henry II
Attorney—Candor, Candor & Tassone, William F. Thornton and Plante, Hartz, Smith & Thompson

[57] ABSTRACT

A fluid-operated gage is provided for determining acceptability of workpieces and such gage uses a pair of classifying devices to classify gaging signals into an acceptable range and indicators operatively connected to the classifying devices to indicate the character of each workpiece being checked. Limit control means is provided causing each classifying device to provide an oscillating signal to its associated indicator within a predetermined band once its limit is reached to enable precise setting of each classifying device.

22 Claims, 8 Drawing Figures

Patented May 30, 1972

INVENTOR
JOHN H. WALKER

BY Candor, Candor & Tassone

HIS ATTORNEYS

Patented May 30, 1972

INVENTOR.
JOHN H. WALKER
BY Candor, Candor & Tassone
HIS ATTORNEYS

FLUID-OPERATED GAGE

CROSS-REFERENCE TO RELATED APPLICATION

This application is a continuation-in-part of application Ser. No. 793,270, filed Jan. 23, 1969, now Pat. No. 3,577,766.

BACKGROUND OF THE INVENTION

In using fluid-operated gaging devices or gages of the digital or "on-off" type it is important that these gages be properly adjusted in a minimum of time without requiring excessive adjustment of associated adjustment means. One technique for checking each setting or limit on a particular gage is through the use of a variable restrictor valve and an auxiliary pressure gage which are used to set and read the actual gaging signal respectively as provided from a known setting master. Another technique which is used for checking each setting or limit requires using extra setting masters which are slightly larger and slightly smaller than the size limits being set on a particular gage. However, these techniques are time-consuming, require additional equipment, and hence are more expensive.

SUMMARY

This invention provides an improved fluid-operated gage of the digital type for determining acceptability of workpieces and such gage is of simple and economical construction and can be readily set even by an inexperienced operator without requiring auxiliary equipment or extra setting masters. In particular, the gage uses a pair of classifying devices to classify gaging signals into an acceptable range and indicators operatively connected to the classifying devices to indicate the character of each workpiece being checked. Limit control means is provided causing each classifying device to provide an oscillating signal to its associated indicator within a predetermined band once its limit is reached to enable precise setting of each classifying device.

Other details, uses, and advantages of this invention will be readily apparent from the exemplary embodiments thereof presented in the following specification, claims, and drawings.

BRIEF DESCRIPTION OF THE DRAWINGS

The accompanying drawings show present exemplary embodiments of this invention, in which.

DESCRIPTION OF ILLUSTRATED EMBODIMENTS

Figure 1:
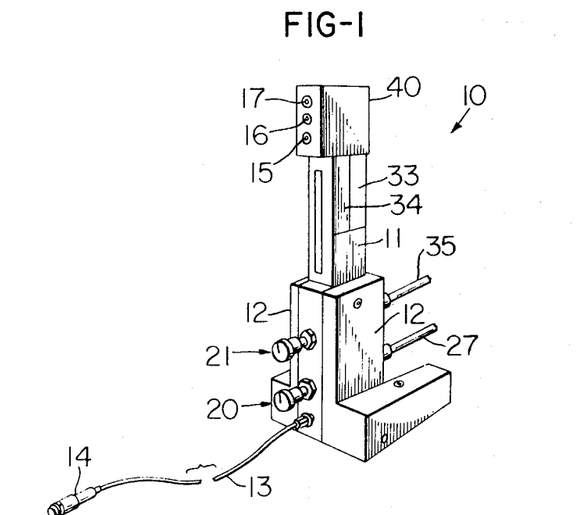
FIG. 1 is a perspective view illustrating a fluid-operated gage which may incorporate an embodiment of this invention.

Reference is now made to FIG. 1 of the drawings wherein an exemplary fluidic gage 10 is illustrated. The gage 10 is utilized in providing dimensional measurements and comprises housing means 11 housing and supporting the principal operating components of the gage in a protected position and a pair of supports 12 suitably fastened in position on opposite sides of the housing 11 and holding such housing in an upright manner for easy accessibility and viewing by a gage operator. The gage 10 has a flexible tube 13 extending from the front face of the housing 11 and in this example of the invention the tube 13 has a gaging head shown as a spindle 14 suitably fastened to its terminal outer end.

The exemplary gage 10 and its associated gaging spindle 14 are illustrated in a typical back-pressure circuit, the operation of which is well known in the art. The spindle 14 of the gage 10 is associated with a pair of master setting rings having precise openings of different diameters and the gage is set, as will be described in detail subsequently, to establish an acceptable range of gaging signals. The spindle 14 may then be associated with an opening in a workpiece to be measured to determine whether such opening falls within the predetermined acceptable range and hence determine acceptability of the workpiece.

Figure 2:
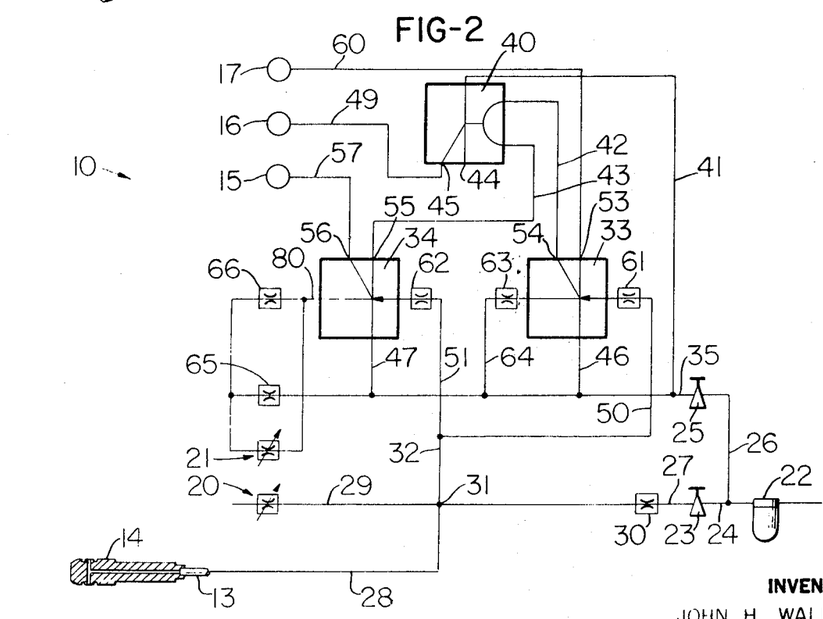
FIG. 2 is a schematic view illustrating the principal operating components of the gage of FIG. 1.

The gage 10 has indicating means shown as a plurality of three visual indicators 15, 16 and 17 each indicating respectively whether a particular workpiece has an opening (as measured by inserting spindle 14 in such opening) which is smaller than the lower limit of the acceptable range, within the acceptable range, or larger than the upper limit of the acceptable range, see FIGS. 1 and 2. The gage 10 also has adjusting means shown as a pair of variable restrictors 20 and 21 which are utilized together with the master setting rings to establish the limits of the acceptable range within which workpieces measured by the gage 10 would be considered acceptable and the operation of the adjusting means will be described in detail subsequently.

The gage 10 preferably utilizes air as an operating medium and the air may be supplied under pressure from any suitable source and suitably filtered through a filter 22. The filtered air is supplied to a pressure regulator 23 through a line 24 and to another pressure regulator 25 through a line 26. The regulated air from the regulator 23 passes through a line 27 which has a fixed restrictor 30 installed therein and the regulated air from the fixed restrictor 30 passes through what will be referred to as a common junction 31 and through a line 28 to the gaging spindle 14. The line 27 has an extension line 29 in flow communication with and extending from the common junction 31 with the adjustable restrictor 20 being provided at the terminal end of the line 29. A line or conduit 32 is also provided in fluid flow communication with the common junction 31 and it will be apparent from FIG. 2 that each gaging signal is provided as a function of the characteristics of a particular workpiece as determined by gage head 14 associating therewith and as influenced by the amount of air bleeding through the adjustable restrictor 20.

The gage 10 has a pair of fluidic signal classifying devices 33 and 34 operatively connected to the conduit 32 and each signal classifying device 33 and 34 is supplied with primary air flow under regulated pressure through associated conduits suitably connected to a line 35 from the pressure regulator 25. The flow of primary air through each device 33 and 34 and hence the operation of each device 33 and 34 is in essence controlled by the effective energy of the gaging signal provided through the conduit 32 and as will be described in detail subsequently.

The gage 10 also has a fluidic gate device 40 which is supplied with air under regulated pressure through a conduit 41 connected in fluid flow communication with the conduit 35 and the gate device 40 is operatively connected to receive an input from the classifying devices 33 and 34 through associated lines 42 and 43 respectively. The gate device 40 performs an AND logic function in a manner which is well known in the art and consequently its component parts will not be described in detail.

The gate device 40 has no moving parts and its primary air flow, supplied through the line 41 as previously mentioned, may be discharged from such device through an outlet opening 44 under conditions where an unacceptable workpiece is being gaged. If the workpiece being gaged is acceptable a combined signal is received through input lines 42 and 43 whereupon primary air flow through the gate device 40 is shifted from its outlet 44 to its outlet 45 and through a line 49 to the indicator 16 which is actuated to indicate an acceptable part.

Each classifying device 33 and 34 is essentially a pneumatic trigger switch which is actuated (to shift its primary air flow) once its particular limit is exceeded and each of such devices may be referred to as a "fluidic Schmitt Trigger." Each trigger switch 33 and 34 has no moving mechanical parts and is comprised essentially of a flip-flop and amplifying means defined as a plurality of proportional amplifiers and a NOR logic gate. The amplifying means provided in each switch 33 and 34 provides a reliable triggering action at the particular limit set on the associated trigger switch with minimum hysteresis and thereby assures that the particular limit is essentially the same regardless of the direction from which the final pressure signal is reached.

The trigger switches 33 and 34 are provided with a main or primary air supply through the conduits 46 and 47 respectively which are connected to the conduit 35. The gaging signal provided through the conduit 32 is provided to the trigger switches 33 and 34 through lines 50 and 51 respectively. The trigger switch 33 is set so that it is actuated only under conditions where a particular gaging signal provided through its line 50 is greater than a first magnitude defining a lower limit of a predetermined acceptable range whereupon primary air flow through the trigger switch 33 is diverted from an outlet 53 thereof to ambient to its outlet 54 and through the line 42 to the gate device 40. Similarly, the trigger switch 34 is set so that it is actuated only if a particular gaging signal provided through its conduit 51 is greater than a second magnitude defining the upper limit of the predetermined acceptable range whereupon primary air flow through the trigger switch 34 is diverted from its outlet 55 normally communicating with conduit 43 to its outlet 56 which is in fluid flow communication with the conduit 57 operatively connected to the indicator 15.

The indicator 17 is connected to the outlet 53 of the trigger switch 33 through a conduit 60 and is actuated by air provided through conduit 60 in the event the gaging signal provided through the conduit 32 is of a magnitude less than the limit defined by the trigger switch 33 thereby signifying, in this example of the invention, a workpiece having an opening which is oversize. In particular, if a gaging signal is less than the magnitude required to trigger the switch 33 the energy of the air jet from conduit 50 into the trigger switch 33 will not be sufficient to divert primary air flow into outlet 54 whereupon flow is provided through outlet 53 and conduit 60 to actuate the indicator 17. With a part having an oversize opening, it will also be appreciated that there will be some air flow through outlet opening 55 of the trigger switch 34 to the gate device 40; however, the effective energy thereof is not sufficient to actuate the gate device 40.

The indicator 15 provides an indication in the event the gaging signal provided through conduit 32 is greater than a second or higher magnitude determined by the setting of the trigger switch 34 whereupon the gaging signal provided to the trigger switch 34 through the conduit 51 causes primary air flow to be diverted from the outlet 55 to the discharge 56 of the trigger switch 34 and through the conduit 57 to actuate and provide an indication on the indcator 15. In this example of the invention, the indication on the indicator 15 signifies a workpiece having an undersized opening and the substantially greater gaging signal is provided through the conduit 32 because less air escapes from the gage head 14 due to less clearance between the particular workpiece and gage head 14 which causes increased pressure in the conduit 51 and hence diversion of air flow in the trigger switch 34 from its outlet 55 to its outlet 56. With a part having an undersize opening the flow through trigger switch 33 will also be diverted from its outlet 53 to its outlet 54 which supplies gate device 40; however, the effective energy of the air to gate device 40 under this condition is not sufficient to actuate such gate device.

In the event that a workpiece being measured by the spindle 14 has an opening within the acceptable range the gaging signal provided through the conduit 32 will be less than the amount required to trigger the trigger switch 34 and greater than the amount required to trigger the trigger switch 33 whereby flow is provided through both conduits 42 and 43 to the gate device 40. The combined energy of air provided through these conduits is sufficient to actuate gate device 40 and divert its primary air flow from its outlet opening 44 to ambient to its outlet opening 45 and into conduit 49, causing the indicator 16 to be actuated.

The regulator 23 used in association with the gage 10 is preferably an adjustable regulator and, if desired, may be adjusted between a plurality of predetermined values. The fixed restrictor 30 may also be of different sizes with each size corresponding to a predetermined setting of the pressure regulator 23 whereby standard back pressure gage tooling may be utilized with the gage 10 in a simple and efficient manner. For example, one setting may be provided on the regulator 23 and the fixed restrictor 30 provided with an effective diameter of 0.0225 inch whereby the spindle 14 may be provided with two 0.0785-inch-diameter open jets to provide 1 psi change for each 0.0001-inch change in clearance between the spindle jets and the workpiece. Similarly, for another predetermined setting on the pressure regulator 23 the fixed restrictor 30 may be provided with an effective diameter of 0.035 inch whereby the spindle 14 may be provided with two 0.0785 inch diameter open jets to provide 1 psi change for each 0.00025-inch change in clearance between the spindle jets and the workpiece. Thus, the basic circuit illustrated in FIG. 2 of the drawings may be utilized with practically all standard back pressure gage tooling substantially without modification and merely by providing a proper restrictor 30 with a corresponding setting therefor being provided on the pressure regulator 23. It will also be appreciated that the restrictor 30 is made so that it is easily installed on and removed from the gage 10.

The trigger switches 33 and 34 may utilize a pair of fixed restrictors 61 and 62 respectively to reduce the magnitude and hence effectiveness of the gaging signal from the conduit 32 so as to control the operating level of the particular trigger switch. In addition, the trigger switch 33 utilizes a fixed restrictor 63 which is operatively connected to the conduit 35 through a conduit 64 and has its outlet connected to the trigger switch 33 so that the air flowing therethrough opposes the air flow defining the gaging signal and flowing through the restrictor 61 whereby the energy level of air flowing through fixed restrictor 61 and fixed restrictor 63 determines whether primary air flow through switch 33 is discharged through its outlet 53 or 54. The fixed restrictor 63 is preferably chosen so that a signal of 12 psig in the gaging circuit is required to trigger the switch 33.

The trigger switch 34 has a pair of fixed restrictors 65 and 66 which, as will be apparent from the drawings, are arranged in series. Further, it will be seen that the adjustable restrictor 21 is arranged in parallel with the restrictor 66. The effective areas of the fixed restrictors 65 and 66 are chosen such that trigger switch 34 switches from its outlet 55 to its outlet 56 at a pressure level of 17 to 19 psig gaging signal provided thereto through conduits 32 and 51. The fixed restrictor 65 operates to limit the bias set on the trigger switch 34 from being set too high even with the adjustable restrictor 21 being fully opened and the restrictor 66 limits the bias from being set too low even with adjustable restrictor 21 being fully closed.

Thus, it is seen that an operator using the fluidic gage 10 must set a 5 to 7 psi spread between the setting of the trigger switch 33 and the setting of the trigger switch 34, which essentially precludes the use of wrong master rings in association with the gaging spindle 14 of the exemplary gage 10.

The adjustable restrictor 21 may be a single unit of simple construction and utilized in a known manner essentially as shown in FIG. 2 of the drawings. However, the restrictor 21 may be provided as a part of an associated assembly 70 (see FIG. 3) comprised of an outer housing 71 having the restrictor 65 defined as a threaded insert and having a fixed opening 72 extending therethrough. The restrictor 66 may be provided as a threaded insert in a disc-like member 73 detachably fastened within the housing 71 and the restrictor 66 has a fixed opening 76 extending therethrough.

Figure 3:
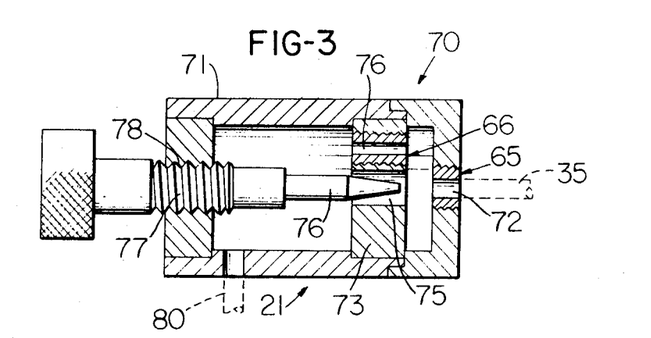
FIG. 3 is a view with parts in elevation and parts in cross section of a device which may comprise the gage of FIG. 1 and may be used to establish one limit of an acceptable range of gaging signals.

The adjustable restrictor 21 comprises an opening 75 in member 73 and the effective area of opening 75 is modified by axial movement of a plug 76. The plug 76 has a threaded forward portion 77 which is threaded through a cooperating threaded opening 78 in housing 71 and a knurled knob is provided for threading the threaded portion 77 in and out. By modifying the effective area of the opening 75 the energy of the bias air provided to the trigger switch 34 through its conduit 80 is modified whereby the trigger point for switch 34 is set.

Thus, it is seen that the assembly 70 may be provided which incorporates the three components 21, 65, and 66 into a single unit so as to provide a foolproof setting of trigger switch 34 and hence the upper limit of the gaging range and thereby assure that an operator cannot use wrong masters.

The adjustable restrictor 20 provided on the fluidic gage 10 is provided to enable foolproof setting of the limit on the trigger switch 33 and hence the lower limit of the gaging range. The circuit is designed such that when the trigger switch 33 is set using new, i.e., substantially unworn tooling, the bleed through the adjustable restrictor 20 is equivalent to allowable tool wear.

Figure 4:
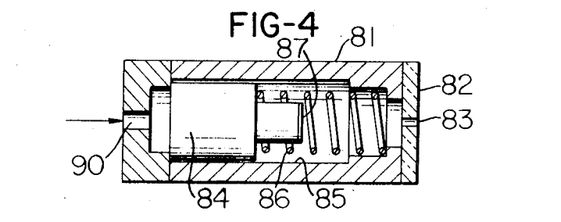
FIG. 4 is a cross-sectional view of an exemplary indicator which is typical of the three indicators comprising the gage of FIG. 1.

As previously mentioned, indicating means in the form of a plurality of three indicators 15, 16, and 17 comprise the gage 10 and the indicators 15-17 of this example are simple on-off visual indicators of substantially identical construction. A typical indicator is illustrated in FIG. 4 of the drawings which is representative of all three indicators 15, 16, and 17.

Each indicator comprises an outer housing 81 having a transparent or translucent member 82 fixed to the forward end thereof and the member 82 has a vent hole 83 provided therein. A piston 84 is provided and supported for axial sliding movement within a bore 85 in the housing 81 and the piston 84 is urged rearwardly by compression spring 86. Each indicator 15-17 is in the form of an on-off indicator and is turned "on" or actuated by its associated piston 84 moving a bright front face 87 thereof forwardly against member 82. As the piston 84 is moved forwardly it overrides the compression spring 86 and with the bright surface 87 arranged immediately adjacent the front member 82 it is readily visible, signifying the associated indicator is on.

Each indicator 15-17 is normally "off," inasmuch as its associated piston 84 is held in a retracted position by the compression spring 86 and each indicator is turned on or actuated by air provided through an opening 90 in the rear portion of its housing 81. Thus, each indicator 15, 16, and 17 is turned on by air under pressure being provided thereto through its associated line 57, 49, and 60 respectively and in the manner previously described. In this example of the invention an undersize opening in a workpiece results in the indicator 15 being turned on, an oversize opening in a workpiece results in the indicator 17 being turned on, and an opening in a workpiece which is within the predetermined acceptable range results in the indicator 16 being turned on. The reference to an indicator being turned "on" merely refers to the fact that the associated bright surface 87 of a particular indicator has been moved outwardly against its associated transparent or translucent front plate 82 by air under pressure.

The gage 10 is set for operation with optimum simplicity and in a foolproof manner so as to preclude the use of wrong tooling and/or wrong masters whereby a comparatively unskilled operator may efficiently use such gage with minimum likelihood of error. In particular, the gage 10 is set for operation by first associating the gage head or spindle 14 with a master ring having a maximum size opening therein and normally expected to provide a gaging signal of comparatively low magnitude which defines the lower limit of a predetermined acceptable range. The indicator 17 is on at this point in the set up procedure and the adjustable restrictor 20 is then adjusted until the indicator 17 goes off. It will be appreciated that by adjusting the adjustable restrictor 20 a partial bleeding of air to atmosphere is provided to thereby respectively modify the energy of the gaging signal in the conduit 32. After adjusting the adjustment restrictor 20 the spindle 14 is then associated with a master ring having a minimum opening therein which is normally expected to provide a gaging signal of greater magnitude corresponding to the upper limit of the range of gaging signals defining an acceptable part whereupon the indicator 16 comes on. The adjustable restrictor 21 is then adjusted until the indicator 16 goes off and the indicator 15 comes on.

In one actual application the effective area of the adjustable restrictor 21 cooperating with the areas of the fixed restrictors 65 and 66 results in the trigger switch 34 being set to switch at a value between 5 and 7 psi greater than the pressure required to trigger the switch 33. In particular, the settings utilized would be to provide a triggering action at 12 psig for the trigger switch 33 and a triggering action between 17 and 19 psig for the trigger switch 34.

In the event that the gaging head or spindle 14 is worn excessively it would be impossible to set either limit. If incorrect masters are used it would be impossible to set both limits. In particular, if the masters are too large, it would be impossible to set the lower limit but the upper limit could be set; and, if the masters are too small the lower limit can be set but the upper limit cannot.

It will be appreciated that there may be an interaction between adjustable restrictors 20 and 21 if such restrictors are varied indiscriminately during the set-up procedure. To avoid such interaction, the variable restrictor 20 is adjusted first, followed by making the necessary adjustments on the restrictor 21.

The operation of a fluidic gage 10 is of utmost simplicity and as will be apparent from the above description the main operating parts thereof have no moving mechanical parts. Further, the character of a particular part being gaged, such as the size of an opening in a workpiece being gaged, is precisely and accurately determined at a glance merely by associating the spindle 14 with a particular workpiece and observing whether the indicator 15, 16, or 17 is on, indicating respectively that the workpiece has an undersized opening, an acceptable opening, or an oversized opening therein. To further aid an operator utilizing the gage 10, the indicators 15 and 17 may be provided so that their surfaces 87 are made of a bright red material, while the surface 87 of the indicator 16 may be made of a bright green material.

Figure 5:
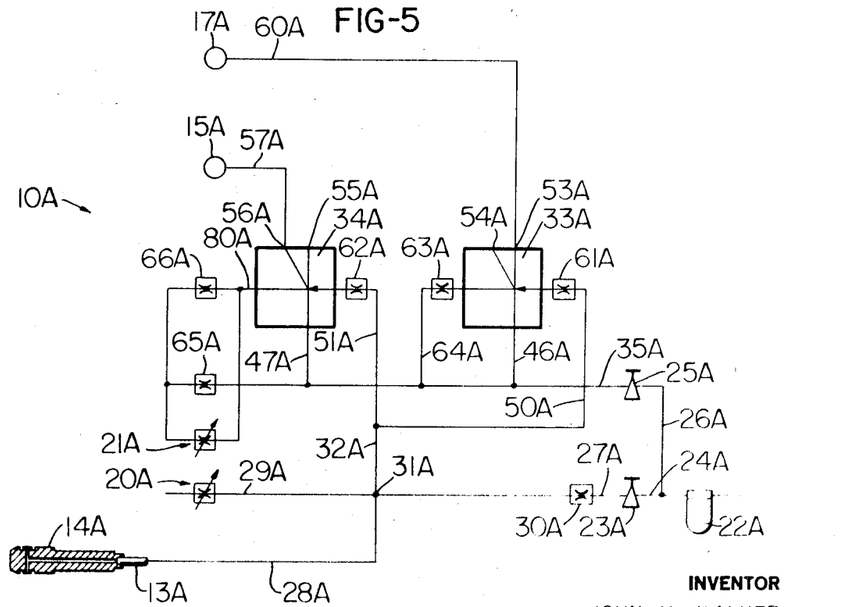
FIG. 5 is a schematic view similar to FIG. 2 and illustrating the principal cooperating components of another fluid-operated gage which may incorporate an embodiment of this invention.

Another exemplary fluidic gage is illustrated schematically in FIG. 5 of the drawings. The fluidic gage illustrated in FIG. 5 is very similar to the gage 10; therefore, such gage will be designated generally by the reference numeral 10A and components of the gage 10A which are very similar to corresponding parts of the gage 10 will be designated by the same reference numeral as in gage 10, also followed by the letter designation A and not described again. Further, a detailed description will not be made of gage 10A; however, the operation of gage 10A and the detailed operation of its component parts is very similar to the detailed operation of gage 10 and its corresponding component parts and reference may be made thereto for an understanding of the operation of the components of the gage 10A.

Basically, the gage 10A utilizes all the component parts of the gage 10, with the exception of the AND logic gate device 40, the associated indicator 16, and conduits leading to and from such components. In essence, the gage 10A only provides a signal when an unacceptable workpiece is being gaged.

Thus, upon inserting the gaging spindle 14A within an opening of an associated workpiece which is oversize, a gaging signal is provided through conduits 32A and 50A, through the trigger switch 33A, and through conduit 60A to provide indication on the indicator 17A. Similarly, upon inserting the gaging spindle 14A within an opening of an associated workpiece which is undersize a gaging signal is provided through the conduits 32A and 51A, through the trigger switch 34A (causing a switching thereof), and through conduit 57A to provide an indication on the indicator 15A. Upon associating the spindle 14A with the workpiece having an acceptable opening therein, the magnitude of the gaging signal in the line 32A is such that it triggers the trigger switch 33A from its outlet 53A to its outlet 54A, yet such gaging signal is not of sufficient magnitude to trigger the trigger switch 34A from its outlet 55A to its outlet 56A whereupon air is discharged through outlets 54A and 55A to ambient and no gaging signal indication is provided on indicators 15A and 17A whereby the workpiece being measured would be acceptable.

The gage 10 is shown in FIG. 1 as having lines 35 and 27 leading directly to the housing 11 with the regulators 23 and 25 not shown; however, if desired, such regulators may be fastened to and supported by the housing 11.

Figure 6:
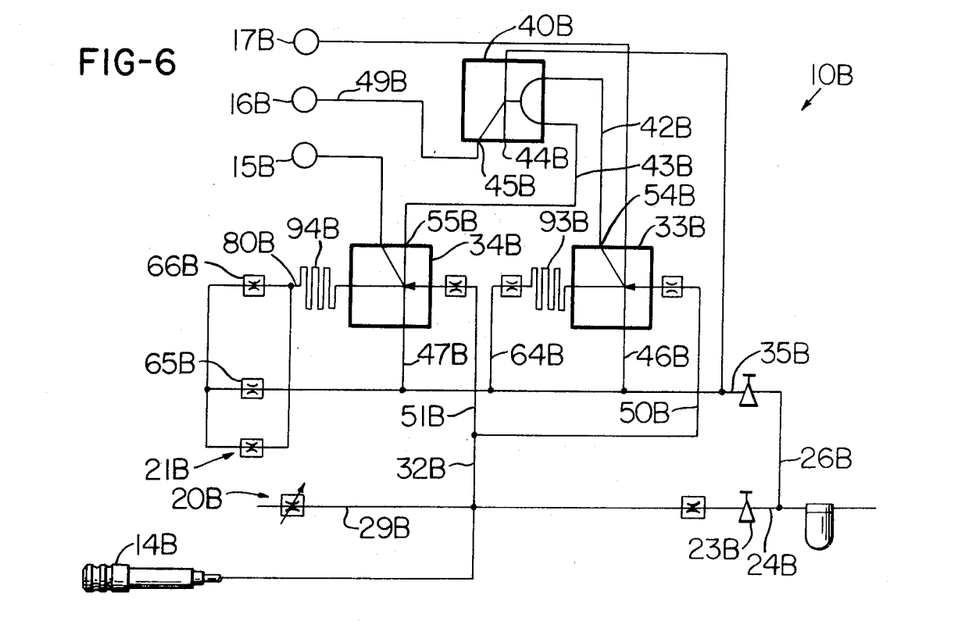
FIG. 6 is a schematic view similar to FIG. 2 illustrating the principal operating components of one exemplary embodiment of the gage of this invention.

An exemplary embodiment of a fluid-operated gage of this invention is illustrated schematically in FIG. 6 of the drawings in the form of a fluidic gage having no moving component parts. The gage illustrated in FIG. 6 is very similar to the gage 10; therefore, such gage will be designated generally by the reference numeral 10B and component parts of the gage 10B which are very similar to corresponding parts of the gage 10 will be designated by the same reference numeral as in the gage 10, also followed by the letter designation B and not described again. However, it will be appreciated that the operation of the gage 10B and the detailed operation of each of its component parts is very similar to the detailed operation of gage 10 and its corresponding component parts and, if required, reference may be made to the description of the gage 10 for an understanding of the operation of gage 10B and its components.

The gage 10B uses all of the component parts of the gage 10 and in addition uses limit control means causing each classifying device 33B and 34B to provide an oscillating signal to its indicator within a predetermined band once its associated limit is reached to enable precise setting of each classifying device. In particular, limit, control means in the form of a pair of devices 93B and 94B are provided and each device 93B and 94B causes its associated indicator 17B and 15B to respectively provide an oscillating indication once the limit of its classifying device is reached while allowing a continuous indication once the limit of its classifying device is exceeded. Each classifying device 33B and 34B of the gage 10B is in the form of a fluidic trigger device or fluidic Schmitt Trigger which is made as a fixed structure having fixed passages therethrough whereby each device 33B and 34B is free of moving parts.

The gage 10B has conduit means defined as conduits 64B and 80B which provide a reference fluid, air in this example, under pressure to each classifying device 33B and 34B respectively and such reference fluid opposes the action of the gaging signal provided from the gaging spindle 14B and through lines 50B and 51B respectively for the classifying devices 33B and 34B.

The limit control devices 93B and 94B of this example may be defined as sections or portions of their respective conduits 64B and 80B and each conduit section provides a tortuous path to the flow of fluid therethrough causing oscillations during flow. In particular, the tortuous path results in a flow condition which causes a build up of pressure and then a relaxation of such pressure in a manner known in the art to provide pressure oscillations which in turn are transmitted through the associated classifying device either 33B or 34B so that the output from each signal classifying device is provided to an associated indicator and results in the provision of an oscillating indication.

Although the tortuous path may have any desired form and may be provided using any technique known in the art, in this example such tortuous path is provided as an undulating path. Further, the tortuous path may be constructed so that it provides any desired number of oscillations. In one application of this invention an undulating path of roughly rectangular wave form was provided in each conduit section 64B and 80B and each path produced roughly 5 cycles or oscillations per second and enabled setting of the gaging range on gage 10B with optimum efficiency and without requiring auxiliary equipment such as extra variable restrictors, pressure gages, or setting masters.

Figures 7, 8:
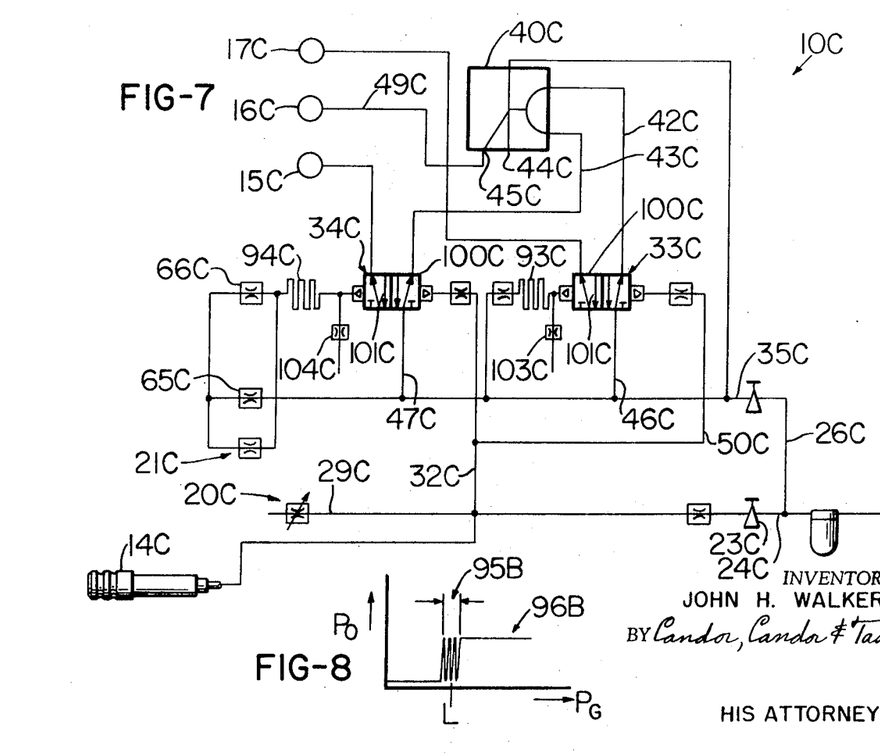
FIG. 7 is a schematic view similar to FIG. 2 and illustrating the principal operating components of another exemplary embodiment of the gage of this invention.
FIG. 8 is a typical graph illustrating the operating characteristics of a signal classifying device comprising the gage of this invention.

The limit control means 93B and 94B provided in the gage 10B are provided in conduit sections externally of their associated trigger devices 33B and 34B respectively; however, in some applications of this invention it may be preferred to provide limit control means as an integral part of each trigger device and in this latter instance each trigger device would have what is popularly referred to as a "noisy" hysteresis band. Regardless of whether a limit control means is provided externally or as an integral part of a classifying device it would cause such classifying device to have performance characteristics essentially as shown in the graph of FIG. 8, which presents a plot of pressure $P_G$ from the gaging spindle to a classifying device versus output pressure $P_O$ from such device. Thus, for a nominal gaging signal or pressure, which may also be referred to as a gaging limit L, from the gaging spindle 14B a band having a predetermined total width 95B is produced and has parts thereof arranged on opposite sides of the limit L. However, once the gaging signal is greater than the value defined by the gaging limit L set on a particular classifying device a steady output pressure is provided having a magnitude as indicated at 96B.

As explained previously in connection with the gage 10, in the event that a workpiece being measured by the spindle 14B has an opening within the acceptable gaging range, the gaging signal provided through the conduit 32B will be less than the amount required to trigger the trigger device 34B and greater than the amount required to trigger the trigger device 33B whereby flow is provided through both conduits 42B and 43B to the gate device 40B. The combined energy of air provided through these conduits is sufficient to actuate the gate device 40B and divert its primary air flow so that it flows through its outlet opening 45B and into conduit 49B causing the indicator 16B to be actuated in an identical manner as previously described in connection with the gage 10.

Another exemplary embodiment of a fluid-operated gage of this invention is illustrated schematically in FIG. 7 of the drawings. The gage illustrated in FIG. 7 is similar to the gage 10; therefore, such gage will be designated generally by the reference numeral 10C and component parts of the gage 10C which are similar to corresponding parts of the gage 10 will be designated by the same reference numeral as in the gage 10 also followed by the letter designation "C" and not described again in a similar manner as presented in connection with the gages 10A and 10B. As previously, a detailed description of the operation of gage 10C will not be presented inasmuch as such operation is similar to and will be readily understood from the previous descriptions of the gages 10, 10A, and 10B.

The gage 10C uses standard spool-type valves 33C and 34C as classifying devices instead of fluidic devices which are free of moving parts. Each classifying device 33C and 34C in this example is in the form of a four-way valve which has an outer housing 100C and spool 101C which is movable back and forth within the housing 100C in a known manner, and each valve 33C and 34C will have a hysteresis due to a small amount of friction or drag between its movable spool 101C and its housing or valve body 100C.

In a similar manner as presented in connection with the gage 10B the valves or classifying devices 33C and 34C have limit control means or devices 93C and 94C respectively. Each device 93C and 94C causes each indicator associated therewith to provide an oscillating indications within a predetermined band (which is very similar to the band 95B presented in connection with devices 33B and 34B of gage 10B) once the limit of its associated classifying device or valve 33C or 34C is reached yet allows a continuous indication once the limit of the associated classifying device is exceeded.

Each limit control device 93C and 94C comprises a conduit section which provides a tortuous, undulating in this example, path to the flow of fluid therethrough and causes pressure oscillations during such flow. The valves 33C and 34C have small bleed orifices in the form of bleed valves 103C and 104C respectively which enable bleeding of air to ambient and assure the valves 33C and 34C may be set properly and will operate in a satisfactory manner under all gaging conditions.

Although the valves 33C and 34C are of the spool type, they still operate in a similar manner as the fluidic trigger switches previously described in connection with the gages 10, 10A and 10B. The valve 33C operates in a similar manner as the fluidic switch 33 to detect an oversize opening in a workpiece while the valve 34C operates in a similar manner as the fluidic switch 34 to detect an undersize opening in a workpiece. Further, both valves 33C and 34C cooperate in such a manner that in the event a workpiece being measured by the spindle 14C has an opening within the acceptable range, the gaging signal provided through the conduit 32C will be less than the amount required to trigger the valve 34C and greater than the amount required to trigger the valve 33C whereby there is a combined flow provided through both conduits 42C and 43C to the gate device 40C. The combined energy of air provided through these conduits is sufficient to actuate the gate device 40C and divert its primary air flow from its outlet opening 44C to its outlet opening 45C and into conduit 49C causing the indicator 16C to be actuated.

In operation, the gages 10B and 10C are adjusted for operation in a substantially identical manner by adjusting certain components and as will now be described in detail in connection with the gage 10B and it is to be understood that corresponding components may be adjusted on the gage 10C to provide adjustment of gage 10C whereby a detailed description of the adjustment of gage 10C will not be necessary. Further, it will be appreciated that the gages 10B and 10C may be rapidly adjusted without requiring auxiliary devices such as complicated and expensive pressure gages, precision adjustable restrictors, additional setting masters, and the like.

The gage 10B is set for operation with optimum simplicity and in a foolproof manner so as to preclude the use of wrong tooling and/or wrong masters whereby a comparatively unskilled operator may efficiently use such gage with minimum likelihood of error. The entire adjustment procedure merely requires adjustment of the two variable restrictors 20B and 21B and because restrictor 20B changes the gaging signal operating range, it is adjusted first.

In particular, the gage 10B is set for operation by first associating the gage head or spindle 14B with a master ring having a maximum size opening therein and normally expected to provide a gaging signal of comparatively low magnitude which defines the lower limit of a predetermined acceptable range. The indicator 17B is on at this point in the set up procedure and the adjustable restrictor 20B is then adjusted until the indicator 17B provides an oscillating indication as caused by its associated limit control device 33B. It will be appreciated that by adjusting the adjustable restrictor 20B a partial bleeding of air to atmosphere is provided to thereby respectively modify the energy of the gaging signal in the conduit 32B.

After adjusting the adjustable restrictor 20B the spindle 14B is then associated with a master ring having a minimum opening therein which is normally expected to provide a gaging signal of greater magnitude corresponding to the upper limit of the range of gaging signals defining an acceptable part whereupon the indicator 16B comes on. The adjustable restrictor 21B is then adjusted until the indicator 16B and the indicator 15B provide oscillating indications as caused by the limit control device 34B which is associated with the indicator 15B. The cooperating relationship of the component parts of the gage 10B is such that in the event the gaging head 14B is worn excessively it would be impossible to adjust the restrictor 20B so that the indicator 17B provides an oscillating indication and in the event incorrect masters are used it would be impossible to adjust the restrictor 20B so that the indicator 17B provides an oscillating indication and to adjust the restrictor 21B so that the indicator 15B provides an oscillating indication whereby the gage 10B is substantially foolproof and may be precisely adjusted independently of auxiliary gaging apparatus.

In this presentation of the invention, the various switches, 33B, 34B, 33C, 34C, are used in association with a solid-state fluidic AND gate or device. However, it will be appreciated that the technique of providing limit control means operatively connected in a system to provide an oscillating indication once the limit of an associated classifying device is reached may be used in a circuit similar to the circuit of FIG. 5 and without requiring an AND device, or the like, therein. Further, it will be appreciated that in those instances where an AND device is used such device need not necessarily be a fluidic device which has no moving parts but may be any suitable fluid operated device.

In this disclosure, the gage is presented as having a gaging spindle which is adapted to be associated with master rings and utilized in checking the sizes of openings in associated workpieces. However, it is to be understood that the gage of this invention may be utilized in numerous other applications and is not limited to applications where dimensional measurements are being made. Further, it is to be understood that in dimensional measurement applications the gaging device of this invention may be effectively used and provided with required tooling to enable rapid and efficient checking of internal diameters and conditions, external diameters and conditions, height, width, depth, and all other conditions which may be checked utilizing a fluid as a gaging medium. In addition, the gaging head utilized may be provided with either contact or non-contact type components of any desired mechanical configuration known in the art.

The detailed physical constructions of the fluidic trigger switches, AND gates, spool-type trigger valves, and various regulators and restrictors have not been shown in the drawings. However, any suitable physical construction, well known in the art, may be used for each of these components.

It will also be appreciated that the members 33, 34, and 40 of gage 10; the members 33A and 34A of gage 10A; and the members 33B, 34B, and 40B of gage 10B together with their associated restrictors and conduits, may be provided in each instance as a single integrated circuit module. Also, the reference made throughout this specification to lines and conduits is intended to cover all types of passages for conveying fluids, whether provided as openings or passages in separate members or as openings or passages in a plate or other member having the trigger switches, for example, integrally provided therein.

Each exemplary embodiment of this invention presented in this specification utilizes two classifying or limit devices. However, it will be appreciated that a gage may be provided with a plurality of more than two limit devices to establish a corresponding number of limits therefor. Further, in some applications a gage having a single classifying device together with an associated indicating means, limit control means, etc., may be sufficient to gage workpieces to determine if openings therein, for example, are either larger or smaller than a particular size, i.e., to determine if openings therein are on one side of a particular size corresponding to a particular magnitude defining a single limit of a gaging range.

The limit control means provided in association with each classifying device of the gages 10B and 10C causes the provision of an oscillating signal within a predetermined band of narrow width. This width may vary for different gaging applications and is kept as small as possible consistent with enabling easy adjustment of the gaging limit without likelihood of overadjustment. In one application of this invention a band having a width roughly 2.5% of the gaging range was successfully used.

While present exemplary embodiments of this invention have been illustrated and described, it will be recognized that this invention may be otherwise variously embodied and practiced within the scope of the following claims.

What is claimed is:

1. A fluid-operated gage comprising, signal means providing a gaging signal, a signal classifying device operatively connected to said signal means, indicating means operatively connected to said device and providing a continuous indication in the event a particular gaging signal is on one side of a particular magnitude defining a limit of a gaging range, and limit control means causing said classifying device to provide an oscillating signal within a predetermined band to its indicating means once said limit is reached causing said indicating means to provide an oscillating indication and thereby enable precise setting of said classifying device.

2. A gage as set forth in claim 1 in which said indicating means comprises an on-off visual indicator which provides a flickering indication upon receiving an oscillating signal.

3. A gage as set forth in claim 1 in which said classifying device comprises a pneumatic trigger device.

4. A fluid-operated gage comprising, signal means providing a gaging signal, a pair of signal classifying devices operatively connected to said signal means, one of said classifying devices being actuated only if a particular gaging signal is greater than a first magnitude defining a lower limit of a range and the other of said devices being actuated only if said particular gaging signal is greater than a second magnitude defining an upper limit of said range, indicating means operatively connected to said devices, said indicating means comprising a first indicator operatively connected to said one classifying device and providing a first continuous indication in the event said particular signal is less than said first magnitude and a second indicator operatively connected to said other classifying device and providing a second continuous indication in the event said particular gaging signal is greater than said second magnitude, and limit control means causing each of said classifying devices to provide an oscillating signal within a predetermined band to an indicator associated therewith once the associated limit of each classifying device is reached to enable precise setting of each classifying device.

5. A gage as set forth in claim 4 in which each of said indicators comprises an on-off visual indicator which provides a flickering indication upon receiving an oscillating signal.

6. A gage as set forth in claim 4 in which each of said classifying devices comprises a pneumatic trigger device.

7. A gage as set forth in claim 4 and further comprising adjusting means for adjusting a classifying device to define the point at which the classifying device is actuated and thereby establish its corresponding limit.

8. A gage as set forth in claim 4 and further comprising adjusting means for adjusting said classifying devices said adjusting means comprising a first variable flow restrictor provided in said gage for setting the limit on said one classifying device and a second variable flow restrictor for setting the limit on said other classifying device.

9. A gage as set forth in claim 4 in which each of said classifying devices comprises a fluidic trigger device which is made as a fixed structure having fixed passages extending therethrough so that each classifying device is free of moving parts.

10. A gage as set forth in claim 4 in which each of said classifying devices comprises a spool-type valve.

11. A gage as set forth in claim 4 in which each of said classifying devices comprises a pneumatic valve having a valve body and a movable spool, said valve being provided in said gage so that said gaging signal tends to urge said spool in one direction and said gage has conduit means providing a reference fluid under pressure to said valve which operates to urge said spool in an opposite direction and in opposition to the urging provided by said gaging signal and said limit control means is operatively connected in an associated conduit means.

12. A gage as set forth in claim 4 and further comprising conduit means providing a reference fluid under pressure to each of said classifying devices to oppose the action of said gaging signal and said limit control means comprises a pair of limit control devices each operatively connected in a conduit means providing reference fluid to an associated classifying device.

13. A gage as set forth in claim 12 in which each of said limit control devices comprises a conduit section which provides a tortuous path to the flow of fluid therethrough and hence causes oscillations during flow.

14. A gage as set forth in claim 13 in which said tortuous path comprises an undulating path.

15. A gage as set forth in claim 4 and further comprising a gate device operatively connected to receive an input from said one classifying device once said gaging signal exceeds said first magnitude and operatively connected to said other classifying device to receive an input once said gaging signal is less than said second magnitude, said gate device being actuated by a combined signal from both of said classifying devices, and a third indicator comprising a part of said indicating means, said third indicator being operatively connected to said gate device to provide an indication once said gate device is actuated by a gaging signal having a magnitude between said first and second magnitudes and hence within said predetermined range.

16. A gage as set forth in claim 15 particularly adapted for dimensional measurements and further comprising an air gage head adapted to associate with a workpiece to provide said gaging signal.

17. A gage as set forth in claim 15 in which said predetermined band comprises less than 2.5% of the gaging range.

18. A gage as set forth in claim 15 in which said limit control means causes its associated classifying device to provide an oscillating signal generally of the order of five oscillations per second.

19. A fluid-operated gage comprising; a gaging head adapted to associate with a workpiece to provide a gaging signal; a pair of signal classifying devices operatively connected to said gaging head; one of said classifying devices being actuated only if a particular gaging signal is greater than a first magnitude defining a lower limit of a range and the other of said devices being actuated only if said particular gaging signal is greater than a second magnitude defining an upper limit of said range; a gate device operatively connected to receive an input from said one classifying device once said gaging signal exceeds said first magnitude and operatively connected to said other classifying device to receive an input once said gaging signal is less than said second magnitude; indicating means operatively connected to said devices; said indicating means comprising a first on-off indicator operatively connected to said one classifying device and providing an indication when said gaging signal is less than said first magnitude, a second on-off indicator operatively connected to said other classifying device and providing an indication when said gaging signal is greater than said second magnitude, and a third on-off indicator operatively connected to said gate device and providing an indication when said gaging signal is between said first and second magnitudes and hence within said range; a first variable restrictor for setting the limit on said one classifying device; a second variable restrictor for setting the limit on said other classifying device; and a pair of limit control means each operatively connected to an associated classifying device causing each classifying device to provide an oscillating signal within a predetermined band to an indicator associated therewith once the associated limit of each classifying device is reached to thereby enable precise setting of the classifying device; said gage being set for operation by first associating said gage head with a master normally expected to provide a gaging signal of said first magnitude whereupon said first on-off indicator is on and said first variable restrictor is adjusted until said first on-off indicator provides an oscillating indication as caused by its associated limit control means, said gage head is then associated with another master normally expected to provide said gaging signal of said greater magnitude causing said third on-off indicator to come on and said second restrictor is then adjusted until said third on-off indicator and said second on-off indicator provide oscillating indications as caused by the limit control means associated with the second on-off indicator, the cooperating relationship of the component parts of said gage being such that in the event said gaging head is worn excessively it would be impossible to adjust said first restrictor so that said first indicator provides an oscillating indication and in the event incorrect masters are used it would be impossible to adjust said first variable restrictor so that said first indicator provides an oscillating indication and to adjust said second variable restrictor so that said second indicator provides an oscillating indication, whereby a substantially foolproof gage is provided which may be precisely adjusted independently of auxiliary gaging apparatus.

20. A gage as set forth in claim 19 in which each of said indicators comprises an on-off visual indicator which is operated solely by fluid from an associated classifying device and provides a flickering indication upon receiving an oscillating signal.

21. A gage as set forth in claim 19 in which each of said limit control means comprises conduit means providing a tortuous path to the flow of fluid therethrough to thereby cause its associated classifying device to provide an oscillating signal.

22. A gage as set forth in claim 19 in which each of said classifying devices comprises a pneumatic trigger device which is actuated once its particular limit is exceeded.

* * * * *